Sept. 15, 1931. D. DE NIET 1,823,593
DEVICE FOR PREVENTING THE SINKING AND STICKING
OF THE GROUND ROPE OF TOWNETS
Filed Aug. 21, 1930
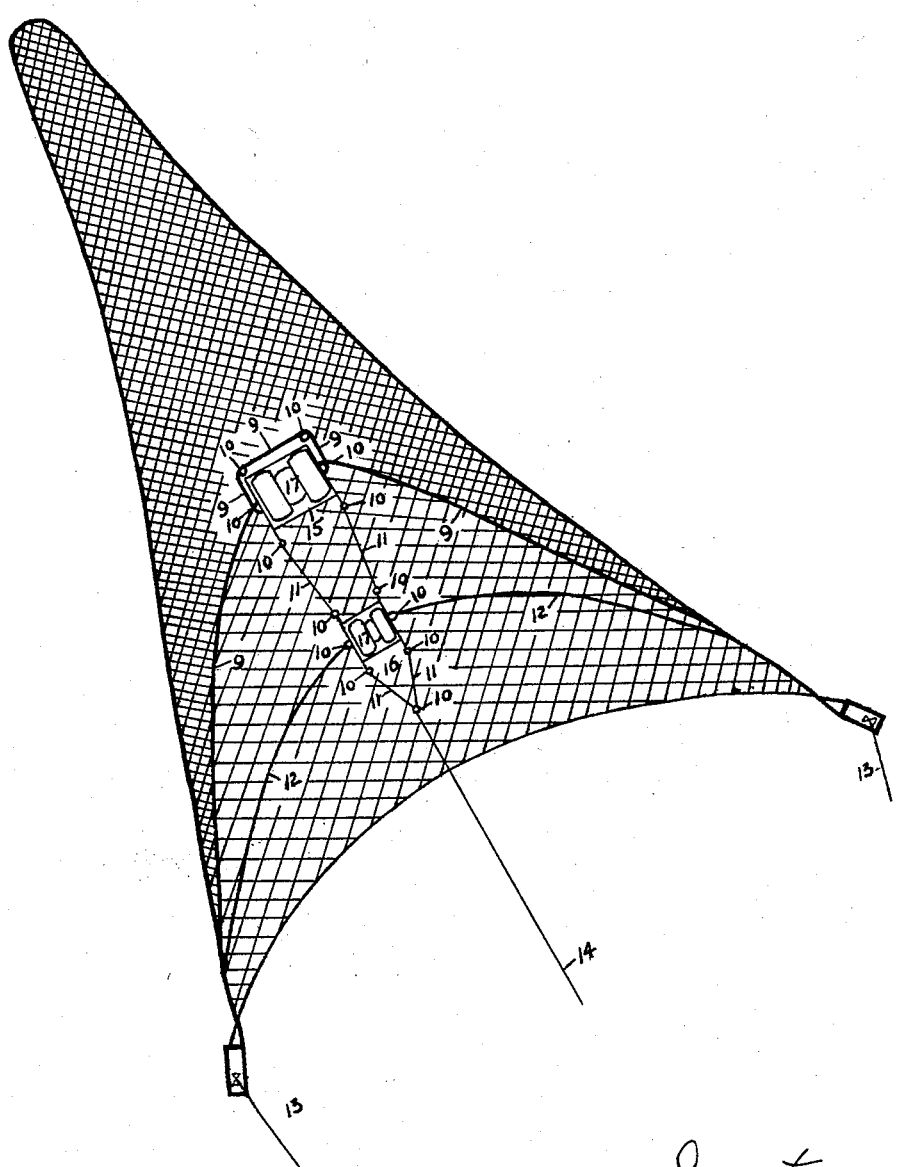

Patented Sept. 15, 1931

1,823,593

UNITED STATES PATENT OFFICE

DIRK DE NIET, OF IJMUIDEN, NETHERLANDS

DEVICE FOR PREVENTING THE SINKING AND STICKING OF THE GROUND ROPE OF TOWNETS

Application filed August 21, 1930, Serial No. 476,858, and in the Netherlands August 7, 1929.

The invention relates to a device for preventing the sinking and sticking (running aground) of the ground-rope (lead-line) of townets (ottertrawls).

In order to prevent the sticking and running aground of the ground-rope of townets on uneven and rocky grounds general use is made of bobbin-rope, which is arranged in front of the ground-rope and which substantially over the full length is provided with round bobbins.

These bobbins not only present a great resistance during the towing of the net, but by their big weight they are sometimes the cause that they cannot work themselves over unevennesses and projecting rocky points; it also occurs, that the bobbin-rope penetrates in freakish ground-obstructions and thereby sinks (sticks). The result is that notwithstanding the arrangement of a bobbin-rope the net is damaged and sometimes gets altogether lost.

The object of the present invention is to overcome these disadvantages. To this end a device is used, by means of which the ground-rope can be lifted as soon as same sinks or runs aground.

The device further is arranged such, that when the ground-rope sinks or runs aground, the towing force is transmitted to the centre point of the ground-rope, whilst the towing-force on the wings of the net is reduced, as a result of which the ground-rope assumes another shape and in this way also cooperates to pass over the obstructions.

According to the invention the device consists of two frames which are provided with bobbins and are connected to each other by bridles or the like. The rear frame of the two is secured to the centre part of the ground-rope and the front one is connected with the tow-boat by means of a stretched line.

Further according to the invention the front frame may be connected with the wings of the net or with the otterboards by means of a two-parted alarm-line.

The invention will be more precisely explained with the aid of the annexed drawing on which a net, provided with the device according to the invention, is illustrated.

A frame 15 is secured to the centre-part of the ground-rope 9 by means of eyelets or the like (10). A shaft or spindle is mounted in the frame and bobbins 17 are rotatable round this shaft. The front-edge of the frame 15 is coupled to the rear edge of a frame 16, located in front of the frame 15, by means of bridles 11 or the like. In this frame 16 a shaft or spindle is also mounted and bobbins 17 are rotatable again round this shaft. The front of the frame 16 is connected in some suitable way by a stretched line 14 with the towing boat.

The front frame 16 is connected with the wings of the net or with the otterboards by a two-parted alarm-line 12.

The townet may be of any shape and is drawn along by the towlines 13.

If the net must overcome a considerable unevenness, the sticking of the ground-rope 9 will be prevented as soon as same cuts in and is retarded, by reason of the stretched line 14, which is now put under tension, exerting a big pull on the frames 15 and 16 and the ground-rope 9 connected therewith. The result of this is, that the device by its small penetrating power and its easily rotating bobbins 17 is compelled to work itself up, where it meets the smallest resistance and at the same time drawing along the alarm line 12 and the ground-rope 9 in the upward direction.

When meeting a very steep ground elevation, the action on the ground-rope will be more vigorous still, since then the line 14 first of all scours over the summit or crest of such an elevation and, with the summit or crest of same as apex, substantially forms a blunt angle, so that the line 14 is stressed very strongly and the device, even before it hits against the elevation takes an upwardly inclined position, the direction of which is followed by the device, drawing along the alarm-line 12 and the ground-rope 9.

The frame 16 opens by each action of the device a way for the frame 15 and, prevents or reduces the cutting-in of the two-parted alarm-line 12, promotes the free position of the line 14 and diminishes the scouring-in of same.

The fact that the frame 16 is secured in the centre-part of the two-parted alarm-line 12, prevents any contact of this line with the net wings.

What I claim is:

A trawl net having a ground rope, an alarm line arranged in advance of the ground rope, and also having tow lines attached to the net wings; a frame attached to the center of the ground line and provided with revoluble bobbins, a second frame arranged in advance of and spaced from the first-named frame, and having revoluble bobbins, said second frame being attached to the center of the alarm line and thereby connected to the net wings or outer boards, and its rear end being connected to the front end of the first-named frame, and a towing line connected to the front end of the second frame.

In testimony whereof I have signed my name to this specification.

DIRK DE NIET.